US009547345B2

(12) United States Patent
Brown (10) Patent No.: US 9,547,345 B2
(45) Date of Patent: Jan. 17, 2017

(54) SYSTEM AND METHOD FOR SAFELY UPDATING THIN CLIENT OPERATING SYSTEM OVER A NETWORK (75) Inventor: Norman P. Brown, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1049 days.

(21) Appl. No.: 13/002,652

(22) PCT Filed: Jun. 25, 2009

(86) PCT No.: PCT/US2009/048735
§ 371 (c)(1),
(2), (4) Date: Jan. 5, 2011

(87) PCT Pub. No.: WO2010/005803
PCT Pub. Date: Jan. 14, 2010

(65) Prior Publication Data
US 2011/0119434 A1    May 19, 2011

Related U.S. Application Data (60) Provisional application No. 61/080,052, filed on Jul. 11, 2008.

(51) Int. Cl.
G06F 12/00 (2006.01)
G06F 13/00 (2006.01)
G06F 13/28 (2006.01)
G06F 1/24 (2006.01)
G06F 9/445 (2006.01)

(52) U.S. Cl.
CPC .. *G06F 1/24* (2013.01); *G06F 8/65* (2013.01)

(58) Field of Classification Search
USPC .................................................. 711/103, 173
See application file for complete search history.

(56) References Cited

U.S. PATENT DOCUMENTS

| 5,579,522 | A  | 11/1996 | Christenson et al. |
| 6,223,284 | B1 | 4/2001  | Novoa et al. |
| 6,282,643 | B1 | 8/2001  | Cromer et al. |
| 6,314,455 | B1 | 11/2001 | Cromer et al. |
| 6,718,464 | B2 | 4/2004  | Cromer et al. |
| 7,069,452 | B1 | 6/2006  | Hind et al. |

(Continued)

FOREIGN PATENT DOCUMENTS

| EP | 0803812 | 10/1997 |
| WO | WO2004/003733 | 1/2004 |

OTHER PUBLICATIONS

EPO, Supplementary EP Search Report dated Oct. 7, 2011, App No. 09794967.1-1243 / 2300929 filed Jan. 11, 2011, PCT/US2009048735 filed Jun. 25, 2009.

(Continued)

*Primary Examiner* — Charles Rones
*Assistant Examiner* — Sidney Li
(74) *Attorney, Agent, or Firm* — Fabian VanCott (57) ABSTRACT A method for updating a thin client image includes the steps of writing a service operating system (OS) from a network device to limited capacity memory of a thin client device, writing a large part of a new image from the network to the memory of the thin client in a series of portions, without writing over the service OS, and writing a final small part of the new image over the service OS.

20 Claims, 9 Drawing Sheets (56) References Cited

U.S. PATENT DOCUMENTS

| | | |
|---|---|---|
| 7,139,909 B2 | 11/2006 | Lee |
| 7,698,698 B2* | 4/2010 | Skan .............................. 717/168 |
| 2002/0002652 A1 | 1/2002 | Takahashi |
| 2002/0099934 A1 | 7/2002 | Cromer et al. |
| 2003/0061323 A1 | 3/2003 | East |
| 2005/0055595 A1* | 3/2005 | Frazer et al. ................. 713/400 |
| 2005/0086464 A1 | 4/2005 | Lee |
| 2005/0144609 A1 | 6/2005 | Rothman et al. |
| 2005/0203944 A1 | 9/2005 | Dinh |
| 2005/0228978 A1* | 10/2005 | Saliou et al. ..................... 713/1 |
| 2005/0229173 A1 | 10/2005 | Mihm et al. |
| 2005/0235280 A1* | 10/2005 | Le et al. ....................... 717/173 |
| 2006/0200658 A1 | 9/2006 | Penkethman |
| 2007/0220013 A1 | 9/2007 | Rabines |
| 2010/0325622 A1* | 12/2010 | Morton ......................... 717/168 |

OTHER PUBLICATIONS

WIPO, International Search Report and Written Opinion, App. No. PCT/US2009/048735, filed Jun. 25, 2009, Mailed Dec. 17, 2009.

\* cited by examiner

SYSTEM AND METHOD FOR SAFELY UPDATING THIN CLIENT OPERATING SYSTEM OVER A NETWORK

CROSS-REFERENCE TO RELATED APPLICATIONS

This Application claims the priority of U.S. Provisional Application Ser. No. 61/080,052 filed Jul. 11, 2008, titled "System And Method For Safely Updating Thin Client Operation System Over A Network" which is hereby incorporated by reference herein as if produced in full below.

BACKGROUND

A "thin client" (sometimes also called a lean client) is a computer device that depends primarily on a central server for processing activities, and mainly focuses on conveying input and output between the user and the remote server. This is to be contrasted with a "thick" or "fat" client, which does as much processing as possible on the local device, and passes only data for communications and storage to the server. Many thin client devices run only web browsers or remote desktop software, meaning that all significant processing occurs on the server.

Thin client computers typically have a very small flash storage device that contains the operating system (OS) and all of the software used on that particular computer. The thin client operating system plus all of the added software is called a "flash image" or "operating system image" and can be handled as one large file.

It can be desirable to update a thin client operating system from time to time. For example, a user of a network having multiple thin clients may desire to modify the original flash image or create their own flash image and redeploy this new image to all of the associated thin clients. Some thin client operating system images provide a feature to re-image the thin client with a new version of the flash image. However, thin clients typically do not have enough available memory to allow downloading of the entire flash image in one operation. Consequently, multiple write cycles are used. Unfortunately, if the thin client device loses power or network connectivity during the relatively long write cycles for downloading the new flash image, it is possible to corrupt the image of a thin client so that the device will not boot at all.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As noted above, many thin clients do not have enough available RAM to allow downloading of an entire new flash image in one operation. Consequently, multiple write cycles are used to update the flash image. Unfortunately, if a thin client device loses power or network connectivity during one of the relatively long write cycles for downloading the new flash image, it is possible to corrupt the image of the thin client so that the device will not boot at all. Some management software solutions load a thin client with a second small operating system to perform the re-imaging of the flash memory. However, this second operating system typically requires from 5 to 20 MB of flash space. Flash space is at a premium on thin clients since flash devices are typically 64 MB on the cheapest systems to 1 GB on the high end thin clients. On the other hand, some thin clients can update the flash image from within their operating system, and can download an entire new flash image into RAM first and then write the entire new flash image to the flash device. Nevertheless, this approach still has a potential window of failure during the write of the new flash image to the flash device.

Advantageously, a method has been developed for safely updating a thin client operating system over a network. As used herein, the term "safely updating" is used to refer to a method for updating (i.e. writing to memory in the thin client a new copy of) a thin client flash image in a manner that reduces the potential window of failure from loss of power or network connectivity during the network download or flash write processes. This method helps minimize windows of failure for updating the flash image.

Figure 1:
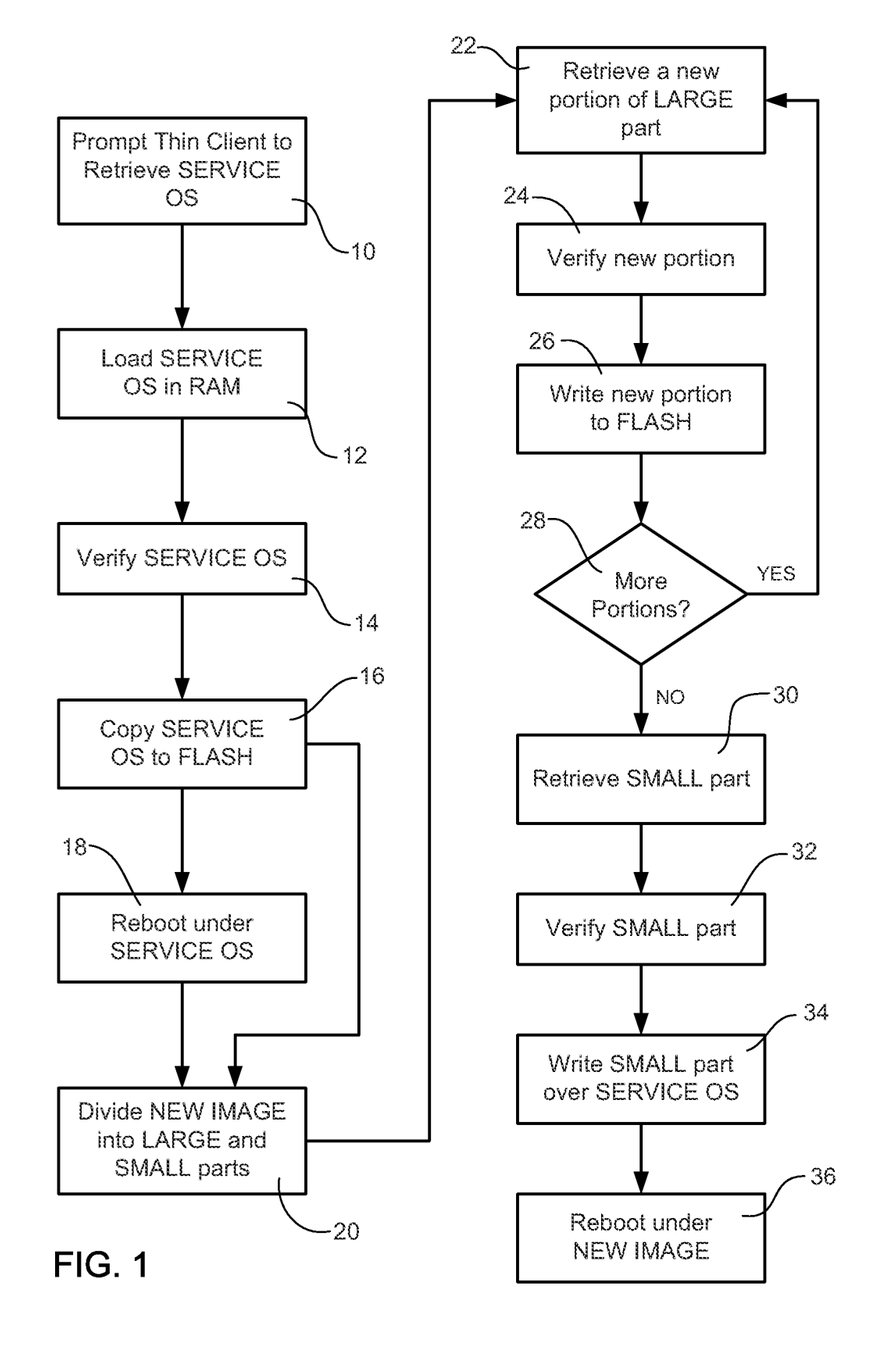
FIG. 1 is a flow chart outlining the steps in an embodiment of a method for safely updating a thin client flash image over a network.
Figure 2:
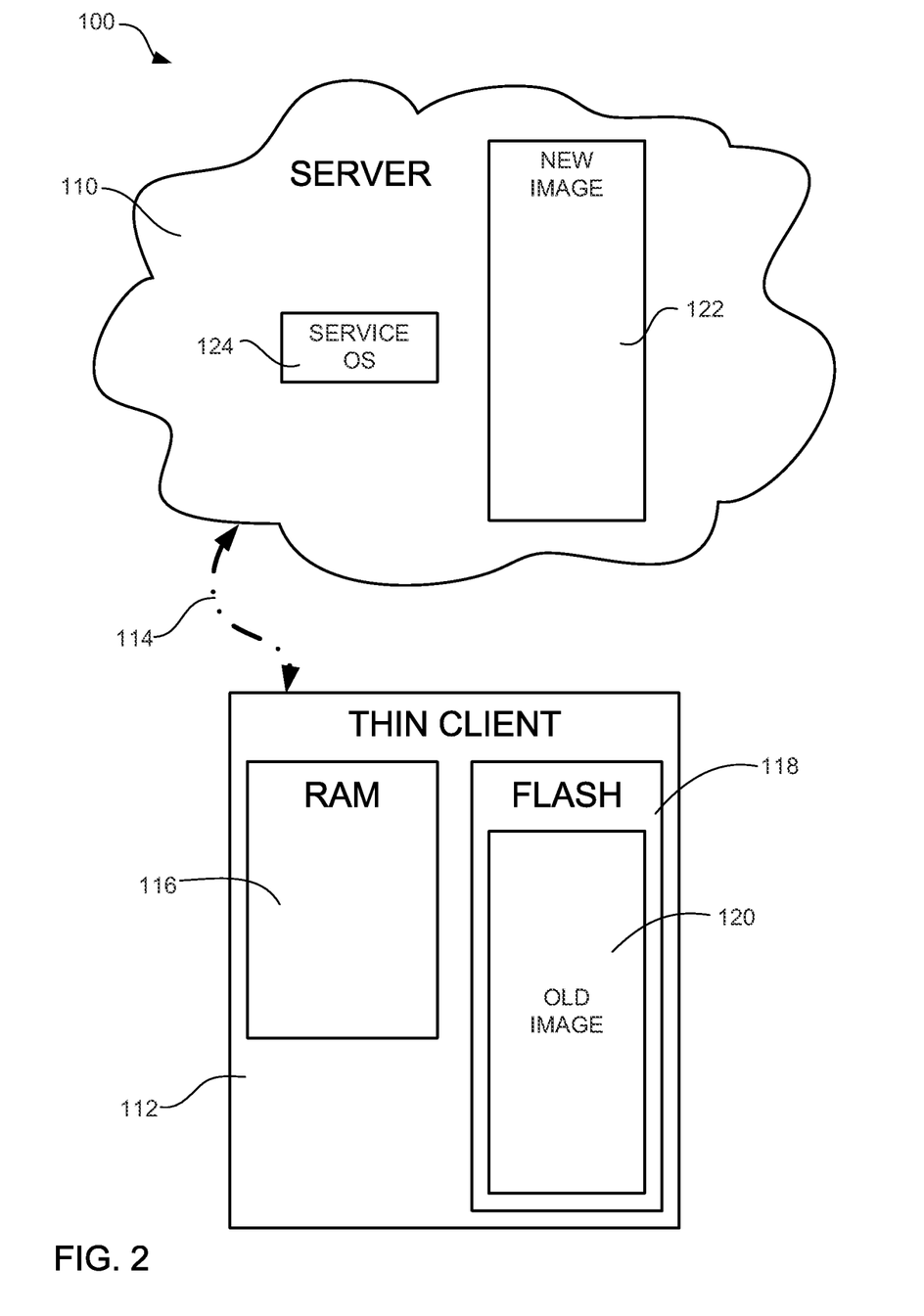
FIG. 2 is a diagram of an embodiment of a thin client connected to a network server having a new flash image and a service operating system ready to download to the thin client.

One embodiment of a safe method for updating a thin client operating system over a network is outlined in the flowchart of FIG. 1, and the related hardware and software components are shown in the block diagrams of FIGS. 2-9. Referring first to FIG. 2, the general components of a system 100 are shown. This system 100 generally includes a server 110, which is connected to a thin client 112 via a communications link 114 (such as a local area network (LAN), the Internet, etc.). The thin client 112 includes random access memory (RAM) 116, and flash memory 118. The flash memory stores the current thin client operating system version, plus all of the software used on that particular computer, collectively labeled "old image" 120 in the figure. As noted above, many thin clients 112 run only remote desktop software or web browsers, and depend primarily on the server 110 for processing activities. Due to it's relatively small size, the current thin client image 120 can be handled as one large file.

Located on the server 110 is a new thin client operating system image version 122, labeled "new image," that is to be downloaded to the thin client 112. The new image can include many new applications and drivers and/or revisions of previous applications and drivers. The server also includes a relatively small service operating system ("service OS") 124 that plays a part in the downloading of the new image 122. The service OS can be a single purpose Linux image, for example. The illustration of FIG. 2 shows the system 100 in a typical operating condition where the thin client 112 utilizes the old image 120.

Figure 3:
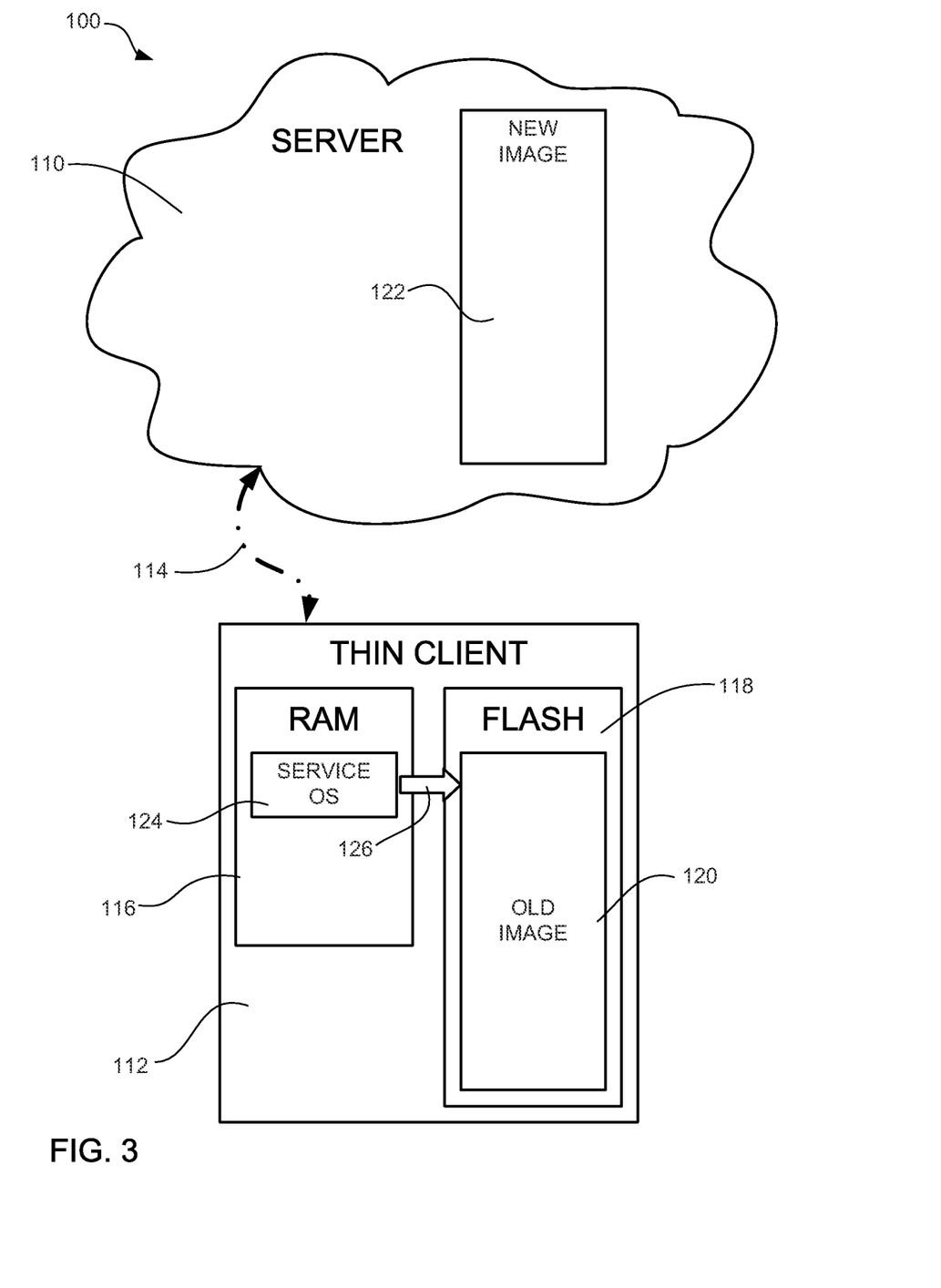
FIG. 3 is a diagram of the embodiment of FIG. 2, showing the service operating system having been downloaded to RAM in the thin client, and being written to flash memory in the thin client.

The process of downloading the new image 122 will be described with reference to the flowchart of FIG. 1 and the block diagrams of FIGS. 2-9. The server 110 first prompts the thin client 112 to retrieve the service OS 124 (step 10 in FIG. 1). Whereupon, as shown in FIG. 3, the service OS 124 is loaded into RAM 116 of the thin client 112 (step 12 in FIG. 1). This download of the service OS can follow a standard file transfer protocol (FTP), as is typically used between a server and a client computer.

Figure 4:
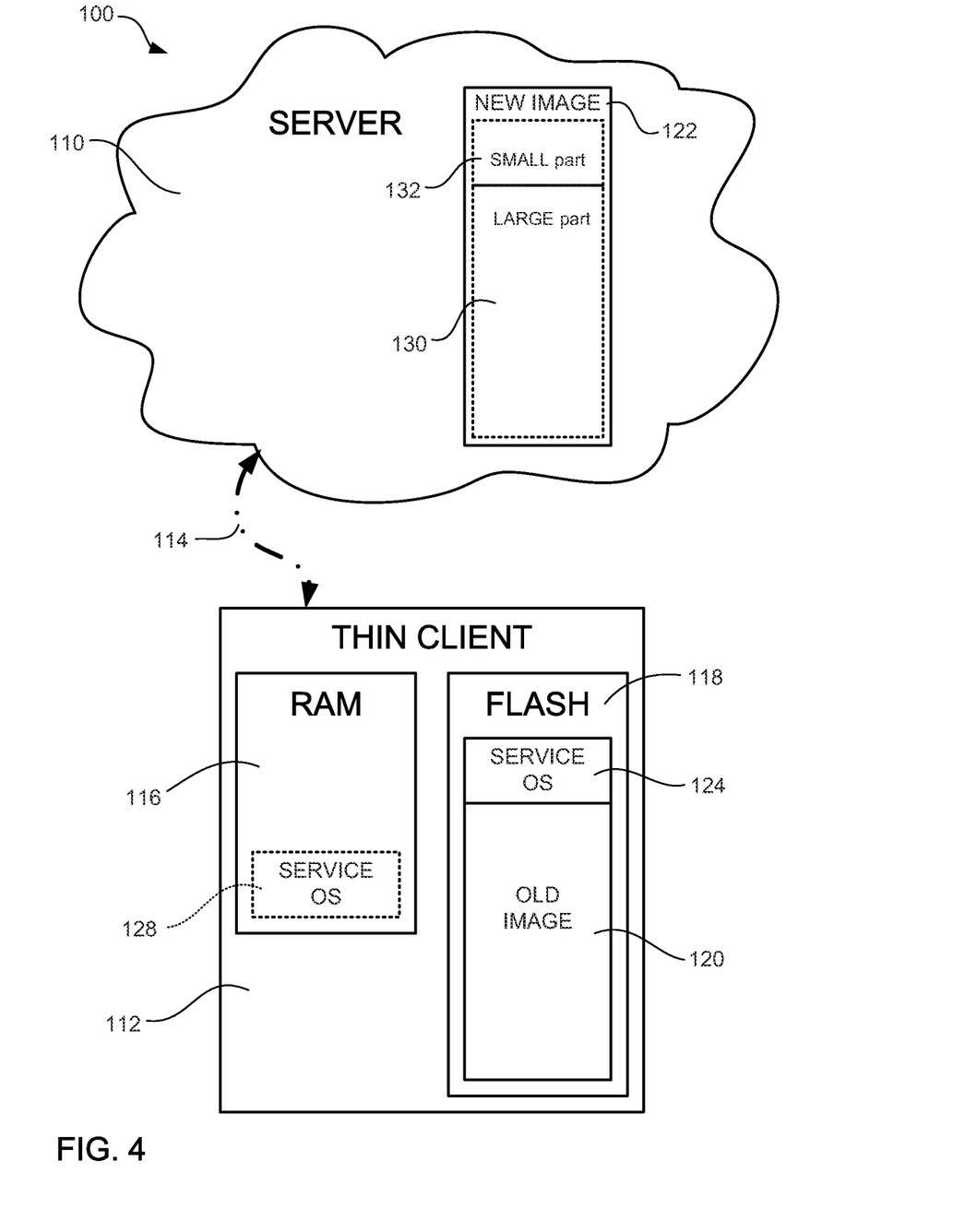
FIG. 4 is a diagram of the embodiment of FIG. 2, showing the service operating system having been written to the thin client flash memory, and the new image having been divided into large and small parts on the server.

Once the service OS 124 has been downloaded into RAM 116, confirmation that the file transfer process occurred properly is performed (step 14 in FIG. 1) and then the service OS is written to the thin client flash memory 118 (step 16 in FIG. 1), as shown in FIG. 4. Advantageously, since the service OS is small (e.g. 3-5 MB), a quick write operation can be performed to write the service OS into the first part of the flash memory. The FTP site's information is also written into the service OS image on the flash memory 118.

At this point the process can take a couple of different paths. In one option, the thin client 112 can be prompted to reboot under the service OS (step 18 in FIG. 1). In such a case, as suggested by FIG. 4, the service OS 124 can be written over any portion of the old image 120, because the old image is no longer needed. Likewise, a copy of the service OS 128 can remain in RAM 116 for direct operation of the thin client 112. Alternatively, the system 100 can be configured to continue operating under the old image 120 (i.e., skipping step 18 in FIG. 1), with the service OS being copied into a partitioned part (e.g. a memory sector that has been labeled as "bad" by the old image) of the flash memory 124. While the system 100 can continue operating under the old image, the service OS is present to allow rebooting the thin client 112 in case of a loss of power or network connectivity during the subsequent steps in the process. Now the device is safe from power failure or network outages. If the device loses power, the service OS will boot and resume the FTP download of the image.

Figure 5:
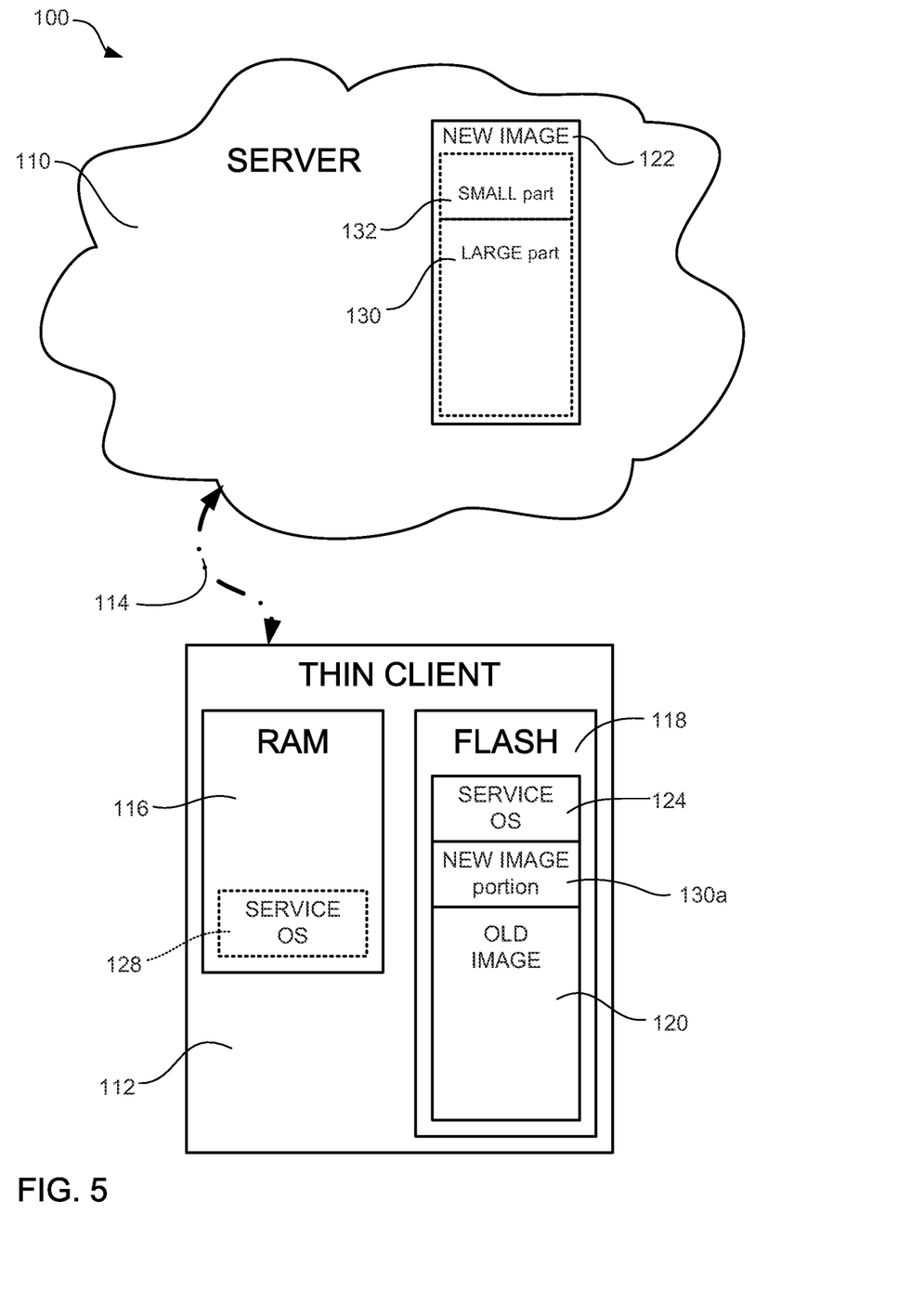
FIG. 5 is a diagram of the embodiment of FIG. 2, showing a portion of the large part of the new image having been written to the thin client flash memory.

After the service OS 124 has been successfully copied to the thin client 112, the next step is to divide the new image 122 into a large part 130 and a small part 132, as shown in FIG. 5 (step 20 in FIG. 1). The smaller part 132 will eventually overwrite the service OS at the end of the process, while the large part 130 comprises the remainder of the new image, and is to be written over the old image in portions starting at the end of the service OS. The system 100 then initiates a process in which the large part 130 is downloaded in convenient pieces and written to the flash memory 118. Specifically, portions of the large part 130 are sequentially retrieved by the thin client (step 22 in FIG. 1), verified by the thin client 112 (step 42 in FIG. 1), and written to the flash memory 118 of the thin client 112 (step 26 in FIG. 1) starting at the end of the service OS. The first portion 130a of the large part 130 can be written over a portion of the old image 120 in the flash memory 118, but not over the service OS 124.

Figure 6:
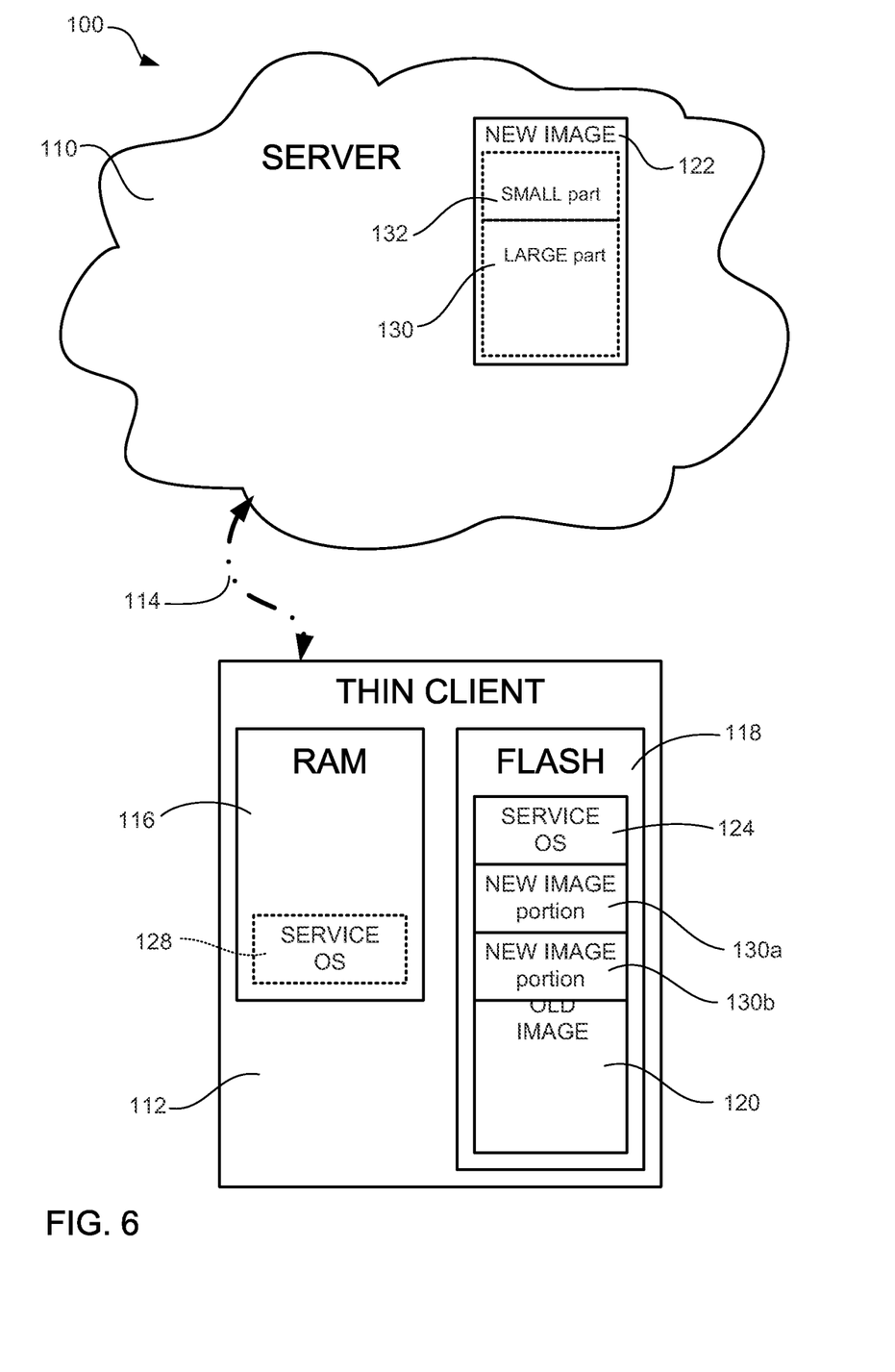
FIG. 6 is a diagram of the embodiment of FIG. 2, showing another portion of the large part of the new image having been written to the thin client flash memory.
Figure 7:
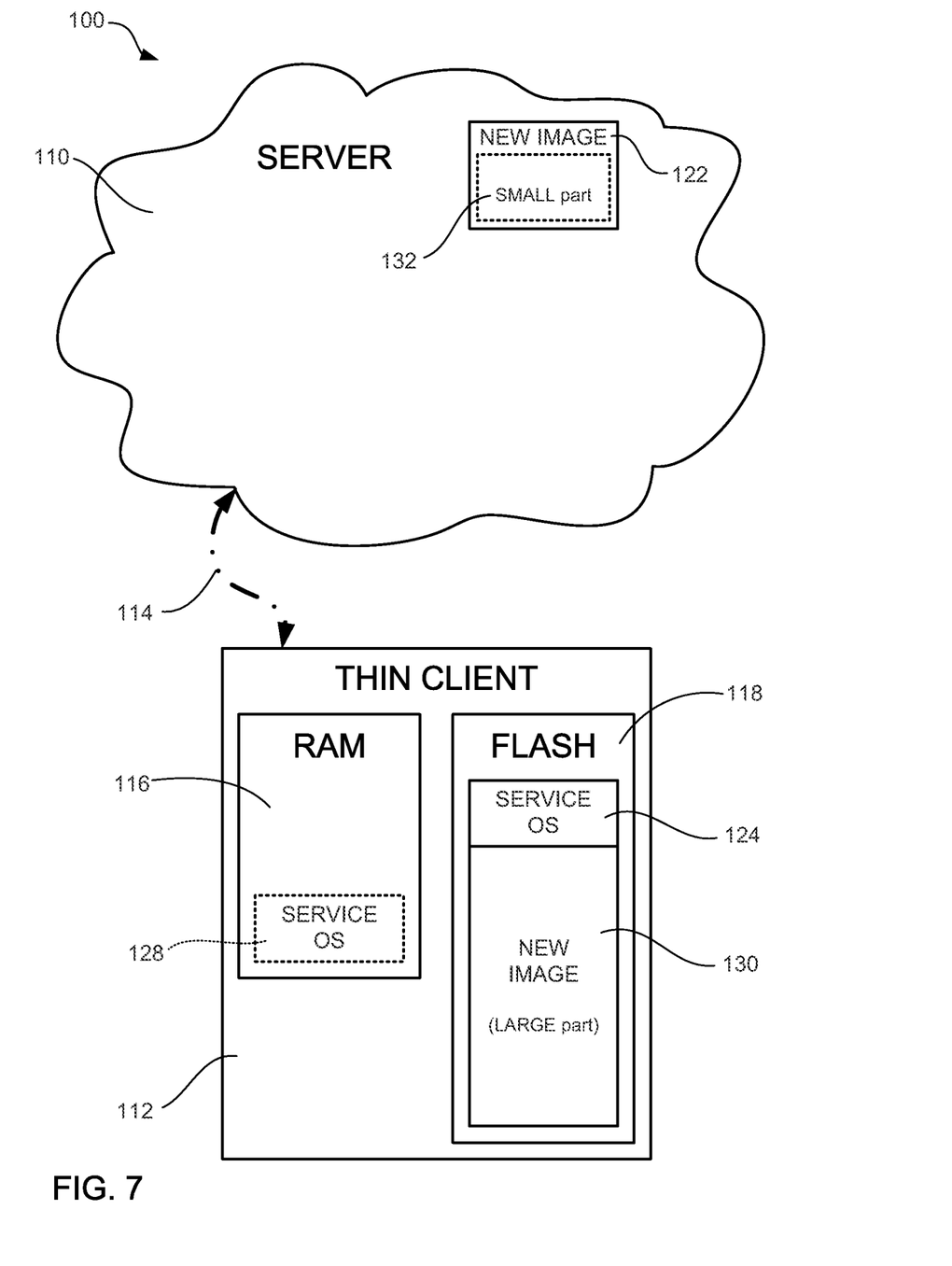
FIG. 7 is a diagram of the embodiment of FIG. 2, showing all portions of the large part of the new image having been written to the thin client flash memory.

This process repeats so long as there are additional portions of the large part 130 to be downloaded (step 28 in FIG. 1). For example, as shown in FIG. 6, the system then retrieves a second portion 130b of the large part 130, downloads, verifies and writes this portion over the old image 120 in the flash memory 118. This continues until all portions of the large part 130 have been written into flash memory in the thin client 112, as shown in FIG. 7.

Figure 8:
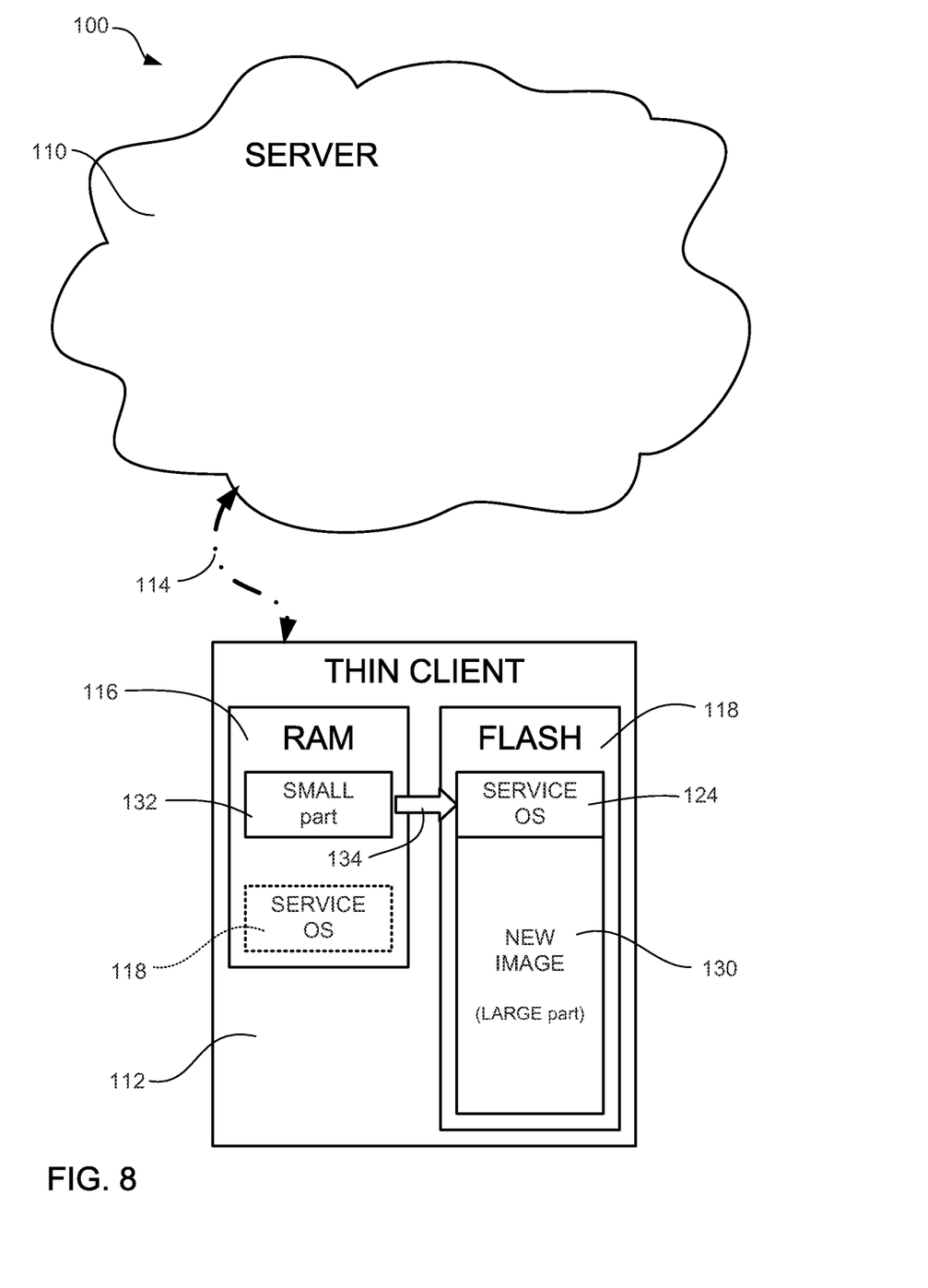
FIG. 8 is a diagram of the embodiment of FIG. 2, showing the small part of the new image having been downloaded to the thin client RAM.
Figure 9:
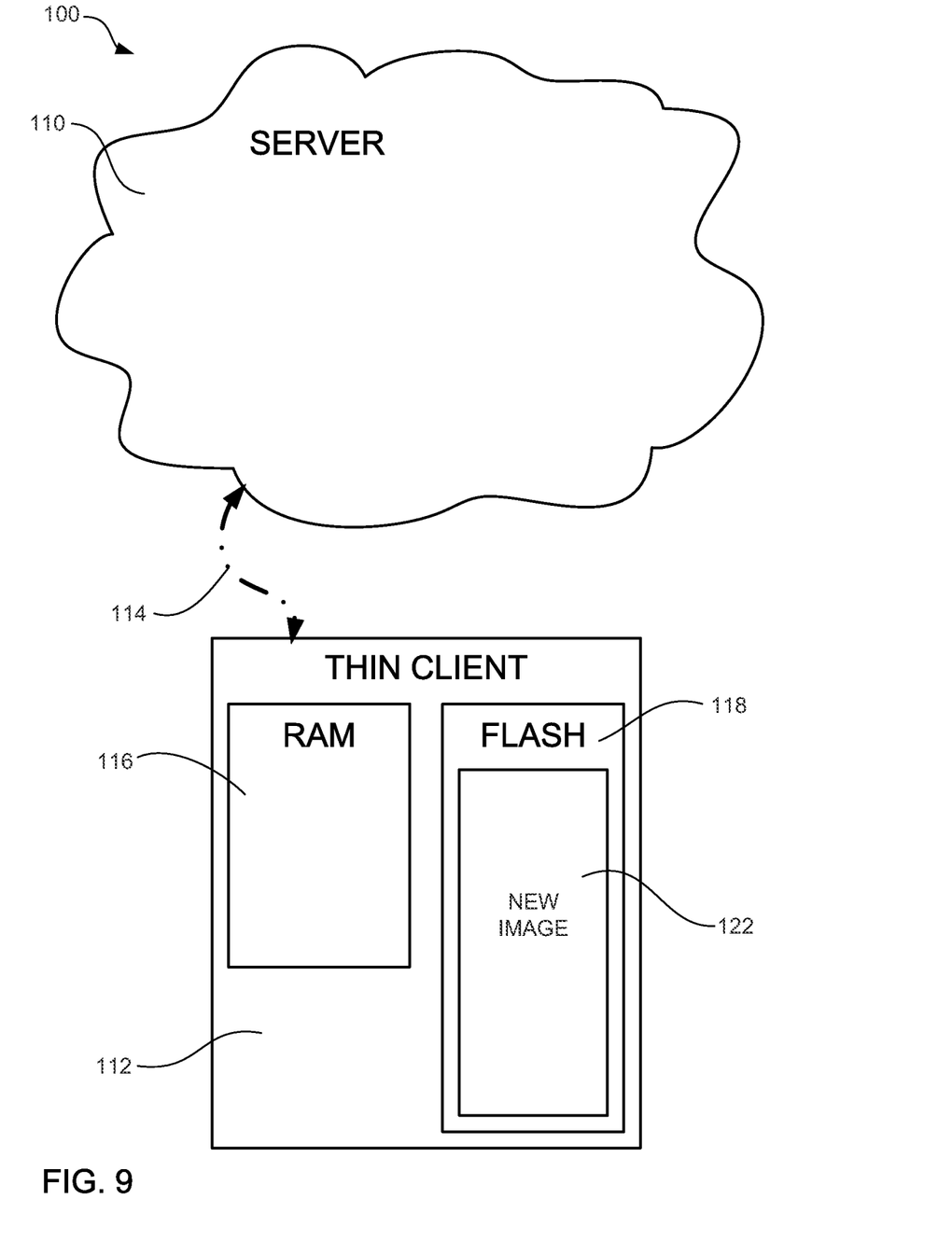
FIG. 9 is a diagram of the embodiment of FIG. 2, showing the entirety of the new image having been written to the thin client flash memory, the small part having overwritten the service OS.

After the large part 130 of the new flash image 122 has been downloaded and written to flash memory 118, the small part 132 that will overwrite the service OS is fully downloaded to RAM 116 (step 30 in FIG. 1) and verified (step 32 in FIG. 1). This process is illustrated in FIG. 8. Once the small part has been fully downloaded to RAM 116, it gets written to the flash memory 118 (step 34 in FIG. 1). The small part 132 is substantially the same size as the service OS 124 (e.g. 2-5 MB), so that this write step happens quickly. Once the small part has been written to flash memory 118, the new image 122 is complete as shown in FIG. 9, and the thin client computer 112 can then reboot under the new flash image (step 36 in FIG. 1).

With this method, the only opportunities for failure are when the service OS is getting written to the flash memory 118, and when the service OS is getting overwritten by the small chunk of the new flash image. These opportunities are only open for the total time it takes to write 4-10 MB of data to the flash memory 118, which is on the order of a few seconds. In contrast, the potential window of failure for some thin client updating systems, where the new image is larger than available RAM, can be several minutes. This method thus reduces the potential window of failure when updating a flash image in a thin client, to allow the new image to be safely written to the flash memory. This method address these potential windows of failure, and also enables thin clients that have a flash image that is larger than available RAM to be safely updated via a network.

Advantageously, the imaging process is performed from within the original operating system. A safe kernel is present through most of the update and will take over if power is ever lost. No extra flash space is needed. The FTP/TCP/IP protocol is typically allowed by firewalls and therefore a thin client user can have one sole location for their home-grown thin client images and allow access from around the world. This method is desirable to thin client users because of the small image size on a thin client. With this method the image size does not need to be smaller than the total available RAM size for the process to work. Additionally, operating system calls can be used to write the new image to the flash memory without having to reboot multiple times.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A method for updating a thin client operating system (OS) image, comprising:
   writing a service OS from a network device to memory of a thin client device, the service OS being written over a first portion of an old OS image, the first portion including a portion of a current OS of the thin client device;
   rebooting the thin client device using the service OS;
   subsequent to rebooting the thin client device and using the service OS, writing a large part of a new OS image from the network to the memory of the thin client in a series of portions, the large part of the new OS image being written over a second portion of the old OS image without writing over the service OS in the first portion; and
   writing a final small part of the new OS image over the service OS in the first portion.

2. A method in accordance with claim 1, wherein the writing of the service OS further comprises:
   loading the service OS into RAM of the thin client; and
   copying the service OS to flash memory of the thin client device.

3. A method in accordance with claim 2, further comprising verifying the service OS prior to copying the service OS to the flash memory.

4. A method in accordance with claim 1, wherein the rebooting of the thin client device using the service OS is performed before writing any part of the new OS image.

5. A method in accordance with claim 1, further comprising the network device dividing the new OS image into large and small parts, the small part being comparable in size to the service OS.

6. A method in accordance with claim 1, wherein the writing of the portions of the large part of the new OS image to the memory of the thin client comprises sequentially writing the portions of the large part over an the second portion of the old OS image stored in memory in the thin client device.

7. A method in accordance with claim 1, wherein the new OS image has a size that is larger than a size of available RAM in the thin client device.

8. A method in accordance with claim 1, further comprising rebooting the thin client using the new OS image after the new OS image has been completely written to memory of the thin client.

9. A computer system, comprising:
   a thin client device, having a memory;
   a server, connected to the thin client device via a network, having in memory a service operating system (OS) for the thin client, and a new OS image for the thin client, the new OS image being divided into large and small parts, the server being programmed to sequentially (a) write the service OS to the memory of the thin client device, the service OS being written over a first portion of an old OS image, the first portion including a portion of a current OS of the thin client device, (b) reboot the thin client device using the service OS, (c) subsequent to rebooting the thin client device and using the service OS, write the large part of the new OS image to the memory of the thin client device in a series of portions, the large part of the new OS image being written over a second portion of the old OS image without writing over the service OS in the first portion, and (d) write the small part of the new OS image over the service OS in the first portion.

10. A computer system in accordance with claim 9, wherein the memory of the thin client device comprises RAM and flash memory, the RAM having available space that is smaller than the new OS image.

11. A computer system in accordance with claim 10, wherein the flash memory of the thin client device contains the old OS image, which is overwritten as the server writes the service OS and new OS image to the thin client device.

12. A computer system in accordance with claim 9, wherein the server is programmed to prompt the thin client device to reboot under the service OS after the service OS has been written to the memory of the thin client device.

13. A method for updating a thin client operating system (OS), comprising:
   writing a service OS from a remote server into memory of a thin client device, the service OS being written over a first portion of an old OS image, the first portion including a portion of a current OS of the thin client device;
   rebooting the thin client device using the service OS;
   dividing a new OS image, stored in memory in the server, into large and small parts;
   subsequent to rebooting the thin client device and using the service OS, sequentially writing the large part to the memory of the thin client in a series of portions, the large part of the new OS being written over a second portion of the old OS image without writing over the service OS in the first portion; and
   writing the small part of the new OS image over the service OS in the first portion.

14. A method in accordance with claim 13, wherein the writing of the service OS into memory of the thin client device comprises writing the service OS to RAM of the thin client device, and copying the service OS from the RAM to flash memory of the thin client device.

15. A method in accordance with claim 13, further comprising rebooting the thin client using the new OS after the new OS has been completely written to memory of the thin client.

16. A method performed by a thin client device comprising random access memory and flash memory storing a current thin client operating system version, the method comprising:
   from a network server system, downloading a service operating system into the random access memory;
   copying the service operating system to the flash memory;
   executing the service operating system in the flash memory to perform operations comprising retrieving an image of a new thin client operating system version from the network server system, wherein the retrieving comprises downloading the image of the new thin client operating system version in a first stage in which a first portion of the image of the new thin client operating system version is downloaded followed by a second stage in which a second portion of the image of the new thin client operating system version is downloaded, sequential sub-portions of the first portion of the image of the new thin client operating system version are written to the flash memory adjacent the copied service operating system during the first stage, and the second portion of the image of the new thin client operating system version is written to the random access memory and then copied from the random access memory to the flash memory during the second stage; and
   rebooting the thin client device under the new thin client operating system version.

17. The method of claim 16, further comprising, after the copying and before the retrieving, rebooting the thin client device under the service operating system in the flash memory.

18. The method of claim 16, wherein service operating system and the second portion of the image of the new thin client operating system version have substantially identical sizes.

19. The method of claim 16, wherein the sub-portions of the first portion of the image of the new thin client operating system version are sequentially written over respective sub-portions of the current thin client operating system version in the flash memory.

20. The method of claim 16, wherein the second portion of the image of the new thin client operating system version is copied over the service operating system in the flash memory.

* * * * *

UNITED STATES PATENT AND TRADEMARK OFFICE
CERTIFICATE OF CORRECTION

PATENT NO. : 9,547,345 B2  
APPLICATION NO. : 13/002652  
DATED : January 17, 2017  
INVENTOR(S) : Norman P. Brown Page 1 of 1

It is certified that error appears in the above-identified patent and that said Letters Patent is hereby corrected as shown below:

In the Claims

In Column 5, Line 38, in Claim 6, delete "over an the" and insert -- over the --, therefor.

Signed and Sealed this
Eleventh Day of April, 2017

Michelle K. Lee
*Director of the United States Patent and Trademark Office*